Oct. 17, 1972 L. D. DYER 3,698,944
METHOD OF OBTAINING PHASED GROWTH OF EPITAXIAL LAYERS
Filed June 15, 1970 3 Sheets-Sheet 1

INVENTOR
Lawrence D. Dyer
ATTORNEY
John E Vandigriff

WITNESS
Richard L Donaldson

Oct. 17, 1972 L. D. DYER 3,698,944

METHOD OF OBTAINING PHASED GROWTH OF EPITAXIAL LAYERS

Filed June 15, 1970 3 Sheets-Sheet 2

WITNESS
Richard L. Donaldson

WITNESS
Richard K. [illegible]

United States Patent Office 3,698,944
Patented Oct. 17, 1972

3,698,944

METHOD OF OBTAINING PHASED GROWTH OF EPITAXIAL LAYERS

Lawrence Dean Dyer, Richardson, Tex., assignor to Texas Instruments Incorporated, Dallas, Tex.
Filed June 15, 1970, Ser. No. 46,190
Int. Cl. B01j *17/28*
U.S. Cl. 117—201 6 Claims

ABSTRACT OF THE DISCLOSURE

Disclosed is a method of preparing substrates that have positions at which nucleation preferentially takes place during epitaxial deposition of a material having a substantially different crystal lattice structure than the substrate material. A substrate, oriented to present a preselected low index reference crystal plane, is cut along a plane having a preselected angle of inclination to the low index crystal plane, the axis of inclination also having a preselected angle with a direction of close-packed atoms in the low index crystal plane. These preselected angles are so chosen that crystal steps and kinks are formed in preselected positions along the surface of the substrate. Since nuclei preferentially form at kinks and crystal steps, proper selection of the cutting plane enables control of the location of nuclei which are substantially in phase with one another across the substrate surface.

This invention relates to epitaxial deposition, and more particularly to epitaxial deposition of a material having a spatial lattice structure significantly different from the substrate material.

Epitaxial deposition of semiconductor films on a substrate is of great importance in the electronic industry. To date, however, such deposition has largely been limited to situations where the lattice spacing of the atoms of the substrate very closely matches that of the atoms of the semiconducor material being epitaxially deposited thereon. As a practical matter, a simple 1:1 atomic spacing match is required at the interface between the substrate and the semiconductor film; that is, the distance between two atoms of the substrate must substantially match the distance between two atoms of the material being deposited, as it is, for example, when forming an epitaxial layer of germanium upon a germanium substrate, a layer of silicon upon a silicon substrate, or a layer of silicon upon a gallium arsenide substrate. In each such case, nuclei of the material being epitaxially deposited may form at random locations on the surface of the substrate and the atoms will still be "in phase" with one another. That is, when the nuclei subsequently coalesce through continued growth to form a continuous layer of the epitaxially deposited atoms, there will be exactly enough space to accommodate each atoms or row of atoms without additional space between them. It may be seen, however, that if a 1:1 correlation of atom spacings is lacking, then voids and mismatches will result when nuclei that have formed at random subsequently coalesce through continued growth. In such a case, the nuclei are said to be "out of phase"; that is, they will not have formed in a physical relationship to one another that will permit epitaxially deposited atoms to interconnect the nuclei in a continuous layer of uniformly spaced atoms. Such mismatches have heretofore precluded epitaxial deposition where the lattice spacing of the substrate and that of the semiconductor film being epitaxially deposited thereon differ significantly; that is, by more than 0.4%. Additionally, since such mismatch defects obviously occur at random, it has not been possible heretofore to obtain a reproducible distribution of defects when attempting to epitaxially deposit with materials having atomic spacing mismatchings and, correspondingly, it has not been possible to obtain devices having reproducible physical and electrical properties.

There is, however, a demand for a method of epitaxially depositing a film on a substrate where the crystal lattice spacing between the film and the substrate differ appreciably. Especially there is a need for a method to epitaxially deposit a semiconductor film on an insulator substrate such as spinel, sapphire, $\beta$ silicon carbide and crystalline quartz, so that electrical devices that operate at very high speeds may be fabricated.

While it is known that semiconductor material may be epitaxially deposited on spinel substrates, for example, see H. Seiter and C. Zaminer, "Epitaxial Silicon Layers From Mg-Al-Spinel," Z. angew. Phys. 20, p. 158, 1965, as described therein, the difference in lattice spacing precludes formation of an epitaxial layer across the entire surface of the substrate. Additionally, U.S. Pat. No. 3,424,955 entitled "Method For Epitaxial Precipitation of Semiconductor Material Upon a Spinel-type Lattice Substrate, issued to H. Seiter et al. Jan. 28, 1969, discloses epitaxial deposition upon a spinel substrate in which the nuclei on the surface of the substrate are "out of phase" with one another. The present invention, however, is an improvement upon the method described in said patent, in that applicant discloses a method for controlling the location of nuclei on the substrate surface which insures that the nuclei form "in-phase" with one another.

Accordingly, it is an object of the present invention to provide an improved method for epitaxially depositing a semiconductor film on a substrate, where the semiconductor material and the substrate have significantly different crystal lattice spacings.

It is another object of the invention to provide a method for preparing the surface of the substrate so that nucleation preferentially takes place at preselected locations.

It is an additional object of the invention to provide a method to control the formation of nuclei on the surface of the substrate so that the nuclei are formed in phase with one another.

And it is still another object of the invention to provide a method for epitaxially depositing a semiconductor layer on an insulator substrate with reproducible distribution of defects, and to attain corresponding improvements in the reproducibility of physical and electrical properties of the resulting device by controlling the location of nucleation sites on the surface of the substrate so that such sites are spaced apart by a multiple of a "matching cell size."

As used herein, and as explained in more detail during the description of FIG. 1, the term "matching cell" is defined as follows: If $n$ and $m$ are integers, and $a$ and $b$ respectively represent the atom spacings of the material being epitaxially deposited and of the substrate material, the crystal lattice of the epitaxial material and the substrate material are said to have a matching cell size $s=na=mb$ where:

$$\frac{na}{mb}=1\pm.004 \qquad \text{(Equation 1)}$$

It may be seen, of course, that a matching cell exists for each combination of one of the various materials that may be epitaxially deposited upon one of the various materials that may be used for a substrate. For example, according to Seiter and Zaminer, if silicon is to be deposited upon a spinel substrate ($MgAl_2O_4$), the matching cell size would be 3 atom spacings between the substrate atoms, into which distance 4 atom spacings of the silicon would very closely fit.

Briefly and in accordance with the present invention, the surface of a substrate oriented to present a preselected crystal plane is prepared so that nuclei form at preselected locations thereon. The spacings between these locations are so controlled that they occur at intervals which are a multiple of the matching cell size that corresponds to the combination of the two materials being used. The surface of the substrate is prepared by sawing, grinding and polishing it at a preselected angle with a preselected low index crystal plane, by which the crystal steps (that is, the individual layers of atoms of the substrate) are spaced apart by intervals which are substantially a multiple of the matching cell size. Cutting the substrate with its surface forming a preselected angle with a low index crystal plane may also be visualized as rotating the cutting plane through a preselected angle about an axis lying in the surface of the preselected low index plane. Since nuclei preferentially form at crystal steps, preparing the substrate surface as above described insures that nuclei will form "in phase" with one another in one direction along the substrate. The sawing, grinding and polishing of the substrate may also be done by causing the axis of the foregoing rotation of the cutting plane to make a preselected angle with a closely packed direction of the atoms in the preselected low index crystal plane, so that kinks will be produced in each crystal step at regular intervals, such intervals substantially approximating a multiple of the matching cell size. Since nucleation also preferentially occurs at kinks, this insures that the formation of nuclei is in phase in a second direction and completes the control of the phasing of the nuclei.

The novel features believed to be characteristic of the invention are set forth in the appended claims. The invention itself, however, as well as other objects and advantages thereof, may best be understood by reference to the following detailed description of illustrative embodiments when read in conjunction with the accompanying drawings in which identical designations refer to identical parts in all figures, and in which:

FIG. 1 diagramatically depicts, in a plan view, the formation of stacking defects when nucleation sites are allowed to be formed at random on a substrate having a spacing between atoms significantly different from that of the material being epitaxially deposited thereon;

Figure 6:
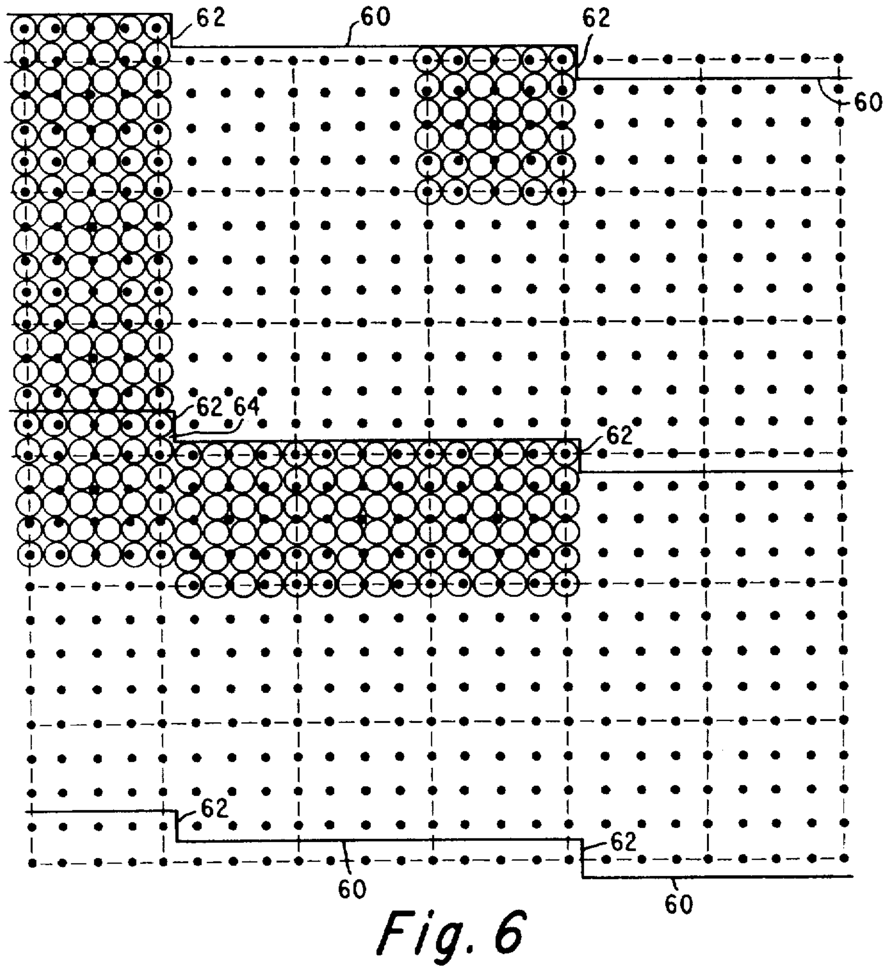

FIG. 6 diagrammatically depicts how steps and kinks further the formation of nucleation sites that are in phase with one another.

Figure 1:
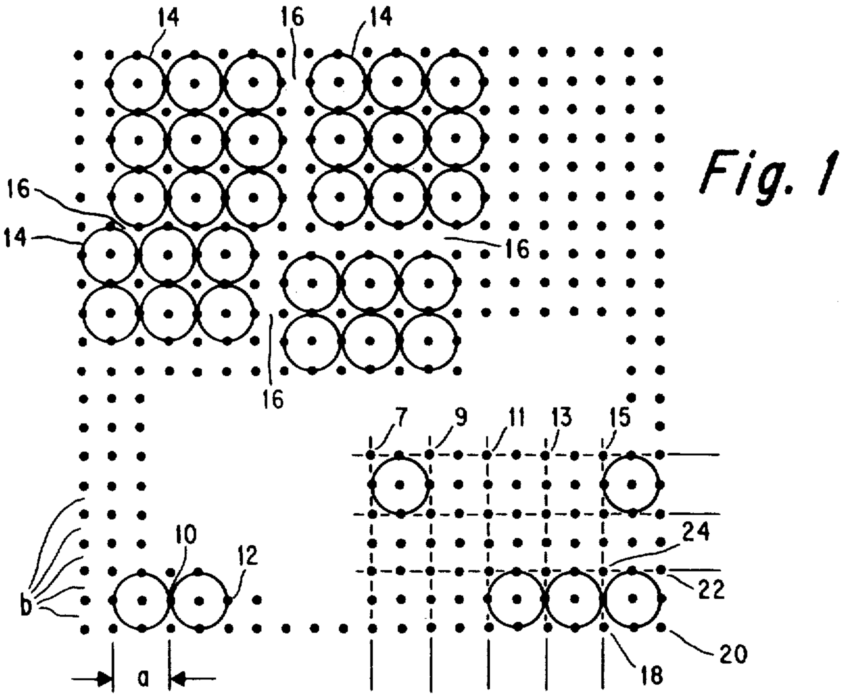

Referring now to the drawings, and for the present particularly to FIG. 1, the small black dots represent atoms of the substrate, and the large circles represent the spacing between atoms of the material to be epitaxially deposited thereon. The distance $b$ between the small black dots represents the spacing between atoms of the substrate material, and the diameter $a$ of the large circles represents the spacing between atoms of the material being epitaxially deposited. As may be seen for the example depicted by FIG. 1, there are 2 atom spacings of the substrate atoms between points 10 and 12 while one such spacing of atoms of the material being epitaxially deposited is required in order to fill exactly the same space. In other words, there is a matching cell size equal to 2 lattice spacings of the substrate material and one lattice spacing of the epitaxial material.

Random formation of nuclei on substrate atoms is depicted at representative locations designated by the numeral 14, and stacking faults in the epitaxial layer growing out from such nuclei are designated generally at 16. Such stacking faults result, as explained above, from the fact that there is a mismatch between the crystal lattice spacing of the material being epitaxially deposited and that of the substrate.

The dashed lines enclose matching cells of the substrate atoms, a typical matching cell being enclosed by 18, 20, 22 and 24. As may be seen, a matching cell in the present example consists of three substrate atoms along each side or two substrate spacings. Further, it may also be seen that one atom spacing of the material being epitaxially deposited exactly fits along a side of the maching cell.

From FIG. 1 it may thus be noted that if nucleation sites 14 were to be located only at the corners of matching cells, for example at locations 7, 9, 11, 13 and 15 of the substrate, then as additional atoms are deposited and a layer of atoms formed thereupon, such atoms would be in perfect alignment and no stacking faults would result.

In accordance with the present invention, the establishment of nucleation sites on the surface of the substrate is so controlled that they are located apart substantially a multiple of the matching cell size, so that when they grow together there is exactly enough space for continuous rows of atoms to be formed, thereby substantially eliminating random stacking faults and dislocation. As mentioned previously, since formation of nuclei preferentially occurs at kinks and then at steps on the surface of the substrate, both in preference to being formed on a flat surface, it may be seen that by forming crystal steps and kinks which themselves occur at distances that are a multiple of the matching cell size apart, the formation of nuclei can be controlled to be substantially "in phase." For example in FIG. 1, if nucleation sites were controlled to form at sites represented at 7 and 15 (that is, at the corners of matching cells separated by three matching cells 9, 11 and 13) then it may be seen that as atoms grow out from nucleation sites 7 and 15 and join together, there will be exactly enough room for the epitaxial atoms to fit, and nucleation sites 7 and 15 would be said to be in phase with another another.

Figure 2:
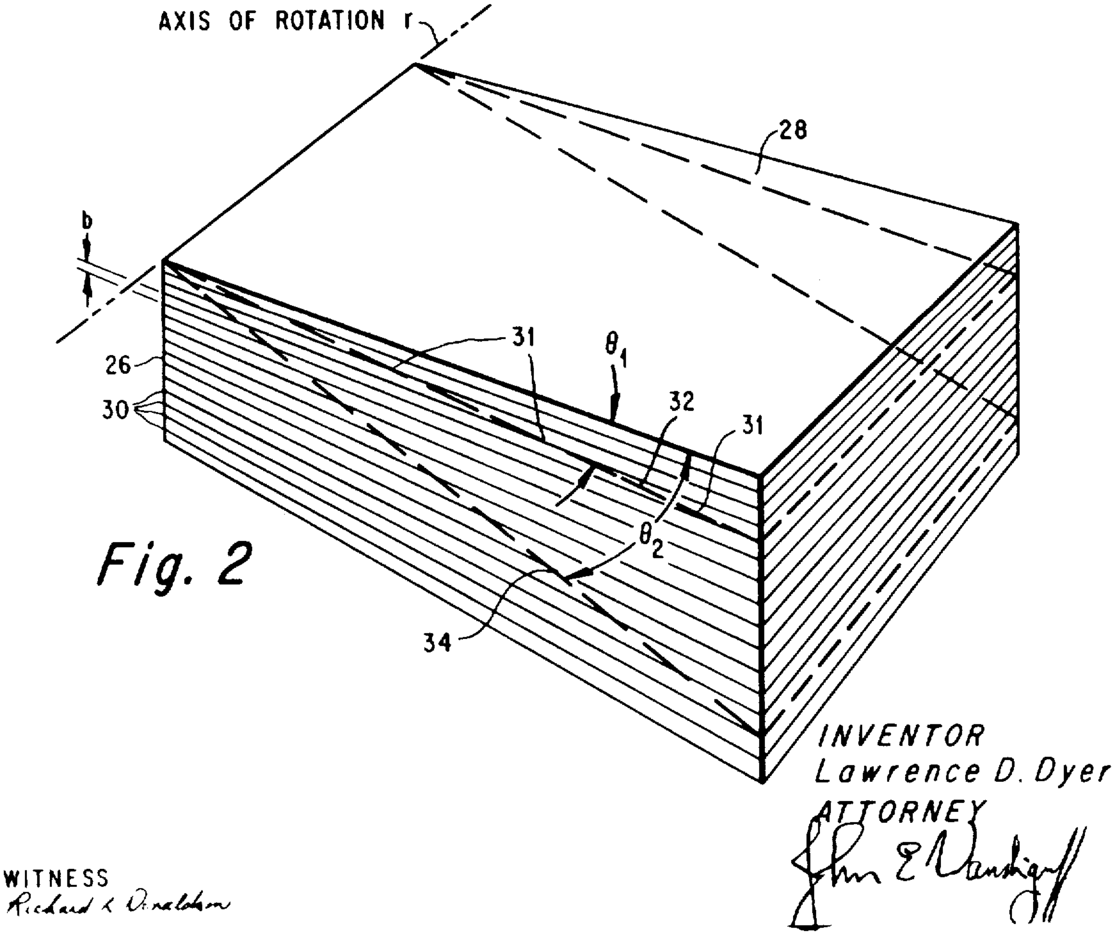
FIG. 2 is a perspective view of a substrate showing the layers of atoms parallel to a crystal plane, and depicting how the distance between crystal steps may be controlled by selecting the angle with the crystal plane at which the substrate is cut.

Referring now to FIGS. 2–5, there is depicted therein the method of controlling the spacings of steps and kinks on the substrate surface. Referring to FIG. 2 specifically, it may be seen how the distance between crystal steps may be controlled. If $\theta$ is the angle of rotation about axis $r$ and $b$ is the atom spacing, then the distance between crystal steps $d=b \cot \theta$. FIG. 2 depicts a perspective view of a substrate 26 oriented so as to present a surface designated at 28, which surface is a preselected low index crystal plane. Representative layers of atoms are diagrammatically depicted layers at 30. If epitaxial deposition were to take place on the substrate surface 28, no crystal steps at all would be present since the top layer of atoms is continuous across the surface of the substrate. Dashed lines, indicated at 32 and 34, show two hypothetical planes through which the substrate 26 could be cut. As shown, if the substrate were to be cut along plane 32, three crystal steps would be formed across the surface of the substrate since three layers of atoms would be traversed, at points designated 31. If the substrate 26 were to be cut along the plane 34, twelve layers of atoms would be cut. Consequently 12 steps would be created across the surface of the substrate.

To determine the angle $\theta$ with the substrate surface 28 at which it is desired to cut the substrate 26, it is necessary first to determine the matching cell size. This size is calculated as set forth previously from Equation 1. For example, if silicon is to be epitaxially deposited on spinel, it has been discovered that three atom spacings of spinel are required to accommodate four atom spacings of silicon. Thus the matching cell size of the spinel substrate is three atomic spacings. Therefore in accordance with the present invention, it would be desired to form steps separated by 3, 6, 9, 12 . . . etc., atom spacings of spinel apart, depending upon the desired multiple of the matching cell size. The required angle of cut $\theta$ may be calculated from the fact that $d=b \cot \theta$, whereby $b$ is the atom spacing of the substrate and $d$ is the spacing between steps. The required separation of crystal steps is defined by $d=Ina$ where I is an integer and $na$ is determined from Equation 1. Thus, $$\theta=\cot^{-1}\frac{Ina}{b} \quad \text{(Equation 2)}$$

It should be noted that in accordance with the present invention, the angle $\theta$ may have various values, depending on the integer I that is chosen. This choice of the angle $\theta$ enables optimization of the present invention with respect to such parameters as the density of nuclei and the accuracy of cutting the crystal. For example, if the accuracy of cutting the crystal (i.e., of controlling the angle $\theta$), is the limiting factor and must be limited to, for instance, plus or minus .01 percent, then a large angle $\theta$ should be selected because the percentage error for a larger angle is reduced for a given degree of inaccuracy. It is pointed out that since each crystal step on the surface of the substrate is located one layer of atoms below the preceding step, the nucleation site thereon will correspondingly be one layer of atoms lower, and a slight mismatch between the atoms interconnecting respective nuclei will inherently result. It will be appreciated that such mismatches occur at controlled rather than random locations. Hence, the properties of the epitaxial layer will be of improved reproducibility although the electrical and physical characteristics of said epitaxial layer may, in some respects, be degraded from those theoretically possible if no such faults were present.

Figure 3:
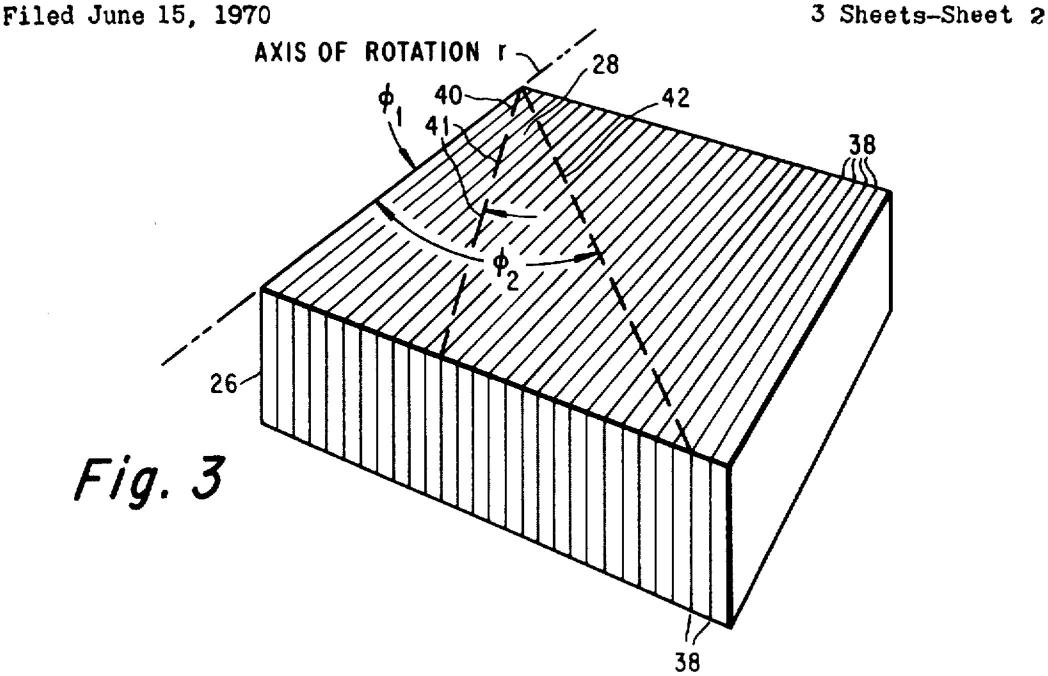
FIG. 3 is a perspective view of a substrate depicting rows of atoms in their closely packed directions on the surface of a given crystal plane, and depicting how the spacing of kinks may be controlled by varying the angle of cut with respect to the direction of the closely packed atoms.

Referring to FIG. 3, there is depicted therein a perspective view of substrate 26. The vertical lines through the substrate 26, respectively joining the transverse lines 38 on the surface 28 of said substrate depict the close-packed direction of atoms, each line representing a row of atoms in said surface 28. For example, when the surface 28 is the {111} plane, line 38 represents the <1$\bar{1}$0> direction. Dashed lines 40 and 42 depict hypothetical lines of intersection of the cutting plane (described in reference FIG. 2) with the substrate 26. As may be seen from the dashed lines 40, 42 the greater the angle that said lines make with the direction 38 of the rows of closely packed atoms, the more rows of atoms the lines will traverse. At the point where each of the lines traverses a row of atoms, a kink is produced. Thus, when the substrate 26 is intersected along line 40, 10 rows of atoms in the surface 28 of the substrate are traversed and 10 kinks are thereby created across the surface 28 of the substrate, the location of representative kinks being designated generally at 41. Similarly, if the substrate is intersected by the cutting plane along line 42, 25 kinks are created. By applying the same principles as discussed above in controlling the spacing between steps of the substrate, it may be seen that the spacing between kinks in a given layer of substrate atoms may be controlled by governing the angle that the line of intersection between the cutting plane and the substrate surface 28 makes with the close-packed direction 38. Thus, as mentioned previously, the spacing between crystal steps may be varied by controlling the amount of rotation $\theta$ about an axis $r$ in the substrate. Further, by controlling the angle $\phi$ that the axis of rotation $r$ makes with direction 38, the spacing between kinks may be controlled.

It should also be appreciated that the angle $\theta$ which the cutting plane makes with the crystal surface 28 of the substrate, thereby to determine the spacing of the crystal steps, and the angle $\phi$ that the rotation axis $r$ makes with the direction of closely packed atoms 38, thereby to control the spacing of the kinks, may be simultaneously controlled so that only one cutting operation is required to obtain preselected spacing of both steps and kinks.

Figure 4:
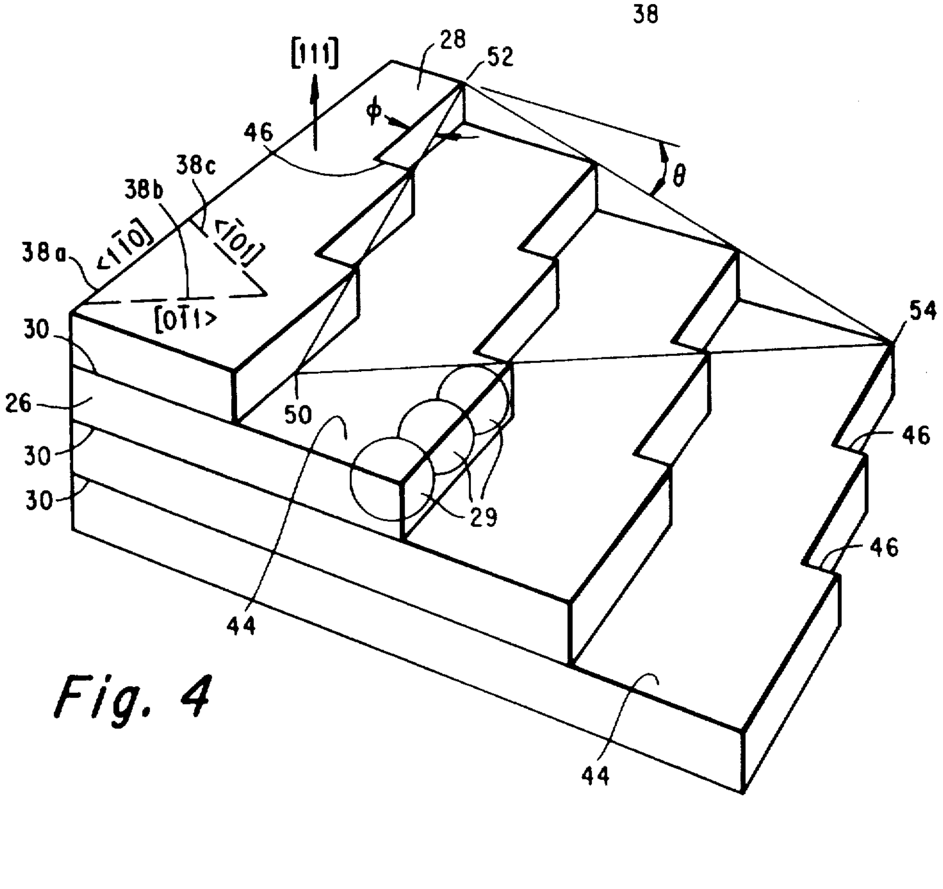
FIG. 4 is a perspective view of a substrate depicting how it may be cut with respect to a given crystal plane in order to create both crystal steps and kinks in one cutting operation.
Figure 5:
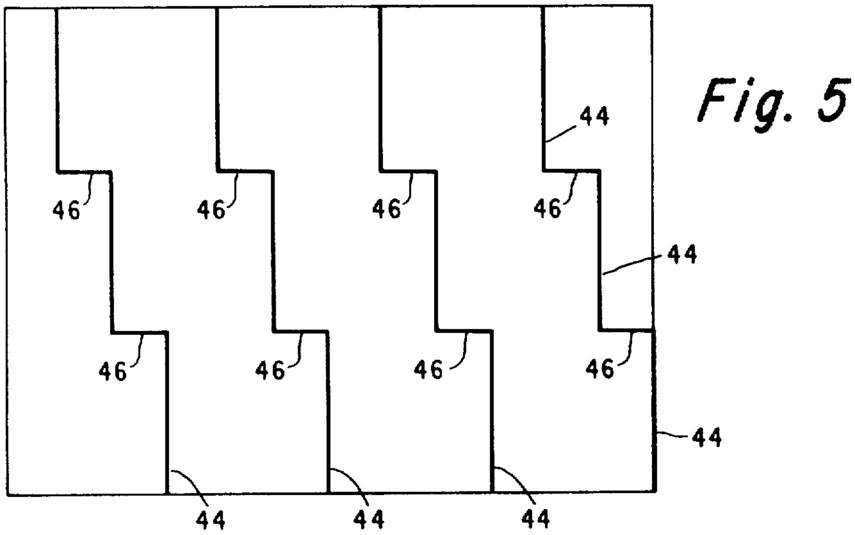
FIG. 5 is a plan view of FIG. 4 showing the steps and kinks.

To further exemplify practice of the present invention, FIG. 4 depicts how steps, designated generally at 44 and kinks, designated generally at 46, are respectively formed at intervals of three substrate atom spacings (one matching cell for the example shown in FIG. 4) by cutting the substrate 26 along a plane defined by 50, 52 and 54. FIG. 5, on the other hand, is a plan view of the substrate 26 depicting the steps 44 and kinks 46 so produced.

Specifically in FIG. 4, the substrate 26 is oriented so as to present a preselected low index crystal plane, such as surface 28. For example, when spinel is the substrate 26, the surface 28 is preferably the {111} plane. Directions of closely packed atoms (the [1$\bar{1}$0], [0$\bar{1}$1], and [$\bar{1}$01], directions when the surface is the (111) plane), are indicated respectively at 38*a*, 38*b* and 38*c*, and the layers of atoms parallel to the surface 28 are indicated generally at 30. Substate atoms are diagrammatically depicted as spheres in a [1$\bar{1}$0] row of atoms at 29.

As may be seen, the substrate 26 has been shown cut along a plane designated at 50–52–54 so as to form crystals steps 44 and kinks 46, succeeding steps and succeeding kinks being separated by one matching cell.

In accordance with the present invention, the substrate 26 is preferably spinel, including $MgO\cdot Al_2O_3$, $MgO\cdot Cr_2O_3$ $MnO\cdot Fe_2O_3$, $ZnO\cdot Al_2O_3$, $FeO\cdot Al_2O_3$, $MnO\cdot Al_2O_3$, $FeO\cdot Fe_2O_3$ and $MgO\cdot Fe_2O_3$. Other acceptable substrates include sapphire, $\beta$ silicon carbide and crystalline quartz. The material being epitaxially deposited is preferably silicon, but other semiconductor materials such as germanium, gallium arsenide, cadmium sulfide, and other Group II and VI compounds may be used.

Although the invention has been described using an insulating substrate and a semiconductor material, as pointed out previously herein, the method of the present invention may be used for controlling phasing of nuclei whenever the crystal lattice structure of the substrate is different from the lattice structure of the material being deposited.

FIG. 6 diagrammatically depicts how the proper spacing of kinks and steps promotes the formation of nuclei which are in phase with one another and which therefore substantially eliminate the random formation of stacking faults. In FIG. 6, the small black dots represent atoms of the substrate and the large circles represent atoms of the material being epitaxially deposited thereon. The dashed lines enclose matching cells of the substrate. In this illustration, the matching cells consist of five atoms of the substrate along each side or, in other words, four atom spacings. Within this matching cell size, six atoms of the material being epitaxially deposited can fit; that is, the total of five atomic spacings of the material being epitaxially deposited very nearly equals four spacings between atoms of the substrate.

In FIG. 6, for convenience, there has been shown steps 60 and kinks 62 formed at intervals of three matching cell sizes apart. As stated earlier, nuclei form preferably at kinks and next in preference along steps. As may be seen from FIG. 6, as the atoms of the material are deposited laterally on the nuclei and ultimately interconnect them, the atoms at the interface between respective nuclei are substantially in alignment.

As will be understood by those skilled in the art, considerable care must be exercised in accurately orienting the substrate and in cutting, grinding and polishing it to the desired angles. Various techniques for achieving the accuracy required are known in the art. For example, various X-ray diffraction spectrometers well known to the art may be used to accurately orient the original insulating crystal ingot prior to sawing on the desired cutting plane. Further accuracy of orientation may be obtained by polishing in a machine similar to that described in The Review of Scientific Instruments, vol. 34, No. 10, 1114–1116, October 1963, "Design and Use of An Acid Polishing Machine" by L. D. Dyer.

Although several embodiments of this invention have been described herein, it will be apparent to a person skilled in the art that various modifications to the details of construction shown and described may be made without departing from the scope of the invention.

What is claimed is:

1. In a method of epitaxially depositing a semiconductor material on one surface of a substrate which has a spatial lattice significantly different from that of said semiconductor the steps comprising:

(a) orienting said surface to present a low index crystal plane; and (b) cutting said substrate along a cutting plane which forms an angle $\theta$ with said low index crystal plane and the axis of rotation of said cutting plane forming an angle $\phi$ with the direction of closely packed atoms of said low index plnae, said angle $\theta$ and said angle $\phi$ respectively being defined as $$\theta=\cot^{-1}\frac{Ina}{b} \text{ and } \phi=\cot^{-1}\frac{Ina}{b}$$

where I is any integer, $a$ is the distance between atoms of said semiconductor, $b$ is the distance between atoms of said substrate, and $n$ is an integer satisfying the expression $na=mb=1\pm.004$ where $m$ is also an integer.

2. In epitaxially depositing a semicoductor film on an insulator substrate, a method for obtaining phased growth of said semiconductor film on said substrate, comprising the steps of cutting and polishing the substrate along a plane having a preselected angle $\theta$ of inclination to a low index plane of said substrate, said axis of inclination having also a preselected angle $\phi$ with a direction of close packed atoms in said low index crystal plane, said preselected angle of inclination $\theta$ being chosen so as to form crystal steps a multiple of the matching cell size apart, and said preselected angle of the axis of inclination $\phi$ with a direction of close packed atom being chosen so as to form kinks, a multiple of the matching cell size apart, whereby nuclei preferentially form at said kinks and steps and are thereby substantially in phase with one another, said angle $\theta$ and said angle $\phi$ being defined as $$\theta=\cot^{-1}\frac{Ina}{b} \text{ and } \phi=\cot^{-1}\frac{Ina}{b}$$

3. The method in accordance with claim 2 wherein said semiconductor is selected from the group consisting of Si, Ge, GaAs, and CdS.

4. The method in accordance with claim 3 wherein said insulator substrate is selected from the group consisting of $MgO\cdot Al_2O_3$, $MgO\cdot Cr_2O_3$, $MnO\cdot Fe_2O_3$, $ZnO\cdot Al_2O_3$ $FeO\cdot Al_2O_3$, $MnO\cdot Al_2O_3$, $FeO\cdot Fe_2O_3$, $MgO\cdot Fe_2O_3$, sapphire and $\beta$ silicon carbide.

5. The method in accordance with claim 2 wherein said semiconductor is silicon and said insulator substrate is $MgO\cdot Al_2O_3$ spinel.

6. The method in accordance with claim 4 wherein said crystal surface of said substrate is the {111} plane and said direction of close packed atoms is the $<1\bar{1}0>$ direction.

References Cited

UNITED STATES PATENTS

| | | | |
|---|---|---|---|
| 3,379,584 | 4/1968 | Bean et al. | 148—175 |
| 3,476,592 | 11/1969 | Berkenblit et al. | 117—106 X |
| 3,325,314 | 6/1967 | Allegretti | 148—175 |
| 3,414,434 | 12/1968 | Manajevit | 117—201 |
| 3,424,955 | 1/1969 | Seiter et al. | 317—237 |

RALPH S. KENDALL, Primary Examiner

U.S. Cl. X.R.

117—213, 106 A; 148—175